US011178364B2

(12) United States Patent
Frederiksen et al.

(10) Patent No.: US 11,178,364 B2
(45) Date of Patent: Nov. 16, 2021

(54) OPERATING METHOD AND CONTROL UNIT FOR A LASER PROJECTION UNIT, AND LASER PROJECTION UNIT

(71) Applicant: Robert Bosch GmbH, Stuttgart (DE)

(72) Inventors: Annette Frederiksen, Renningen (DE); Nico Heussner, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/617,955

(22) PCT Filed: Mar. 22, 2018

(86) PCT No.: PCT/EP2018/057386
§ 371 (c)(1),
(2) Date: Nov. 27, 2019

(87) PCT Pub. No.: WO2018/219519
PCT Pub. Date: Dec. 6, 2018

(65) Prior Publication Data
US 2020/0120317 A1  Apr. 16, 2020

(30) Foreign Application Priority Data

Jun. 1, 2017 (DE) .......................... 102017209271.8

(51) Int. Cl.
*H04N 9/31* (2006.01)

(52) U.S. Cl.
CPC ......... *H04N 9/3135* (2013.01); *H04N 9/3155* (2013.01); *H04N 9/3161* (2013.01);
(Continued)

(58) Field of Classification Search
CPC .. H04N 9/3135; H04N 9/3129; H04N 9/3161; H04N 9/3179; H04N 9/3182; H04N 9/3155
See application file for complete search history.

(56) References Cited

U.S. PATENT DOCUMENTS

2002/0131634 A1* 9/2002 Weibrecht ................ H04N 9/43
382/162
2006/0227147 A1  10/2006 Diels et al.
(Continued)

FOREIGN PATENT DOCUMENTS

CN      105589288 A    5/2016
EP       2942774 A1   11/2015
(Continued)

OTHER PUBLICATIONS

Konno et al.; JP 2010/044204 A; 2010; Machine Translation into English (Year: 2010).*
(Continued)

*Primary Examiner* — Ryan D Howard
(74) *Attorney, Agent, or Firm* — Norton Rose Fulbright US LLP; Gerard Messina

(57) ABSTRACT

An operating method for a laser projection unit includes providing a data set representing a sequence of images or partial images to be projected and formed from image elements; before the projection, examining the data set with respect to a brightness of the image elements, determining a maximum brightness from the image elements, and determining a relative brightness of the image elements relative to the determined maximum brightness; and projecting the images or partial images of the data stream or part of the data stream by activating laser light sources of an illumination unit according to the relative brightnesses such that the brightness of a laser light source for an image element to be projected having a maximum relative brightness corresponds to a predetermined maximum absolute brightness, or lies in a safety interval below the predetermined maximum absolute brightness.

18 Claims, 2 Drawing Sheets

(52) U.S. Cl.
CPC ......... *H04N 9/3164* (2013.01); *H04N 9/3179* (2013.01); *H04N 9/3194* (2013.01)

(56) References Cited

U.S. PATENT DOCUMENTS

| | | | |
|---|---|---|---|
| 2009/0096994 A1* | 4/2009 | Smits | G01B 11/14 353/30 |
| 2009/0263099 A1* | 10/2009 | Shintani | H04N 19/107 386/248 |
| 2012/0218283 A1 | 8/2012 | Ishii | |
| 2013/0335642 A1 | 12/2013 | Fujioka | |
| 2014/0340585 A1 | 11/2014 | Heinzelmann et al. | |
| 2016/0205363 A1 | 7/2016 | Okumura | |
| 2017/0140733 A1 | 5/2017 | Park et al. | |

FOREIGN PATENT DOCUMENTS

| | | |
|---|---|---|
| JP | 2004345113 A | 12/2004 |
| JP | 2010044204 A | 2/2010 |
| JP | 2017044783 A | 3/2017 |
| WO | 2011086849 A1 | 7/2011 |

OTHER PUBLICATIONS

International Search Report dated Jul. 16, 2018 of the corresponding International Application PCT/EP2018/057386 filed Mar. 22, 2018.
DIN EN 60825-1 (VDE 0837-1):Jul. 2015. Safety of laser products. Part 1: Equipment classification and requirements (IEC 60825-1-1:2014); German version EN. (2015), pp. 1-5.

* cited by examiner

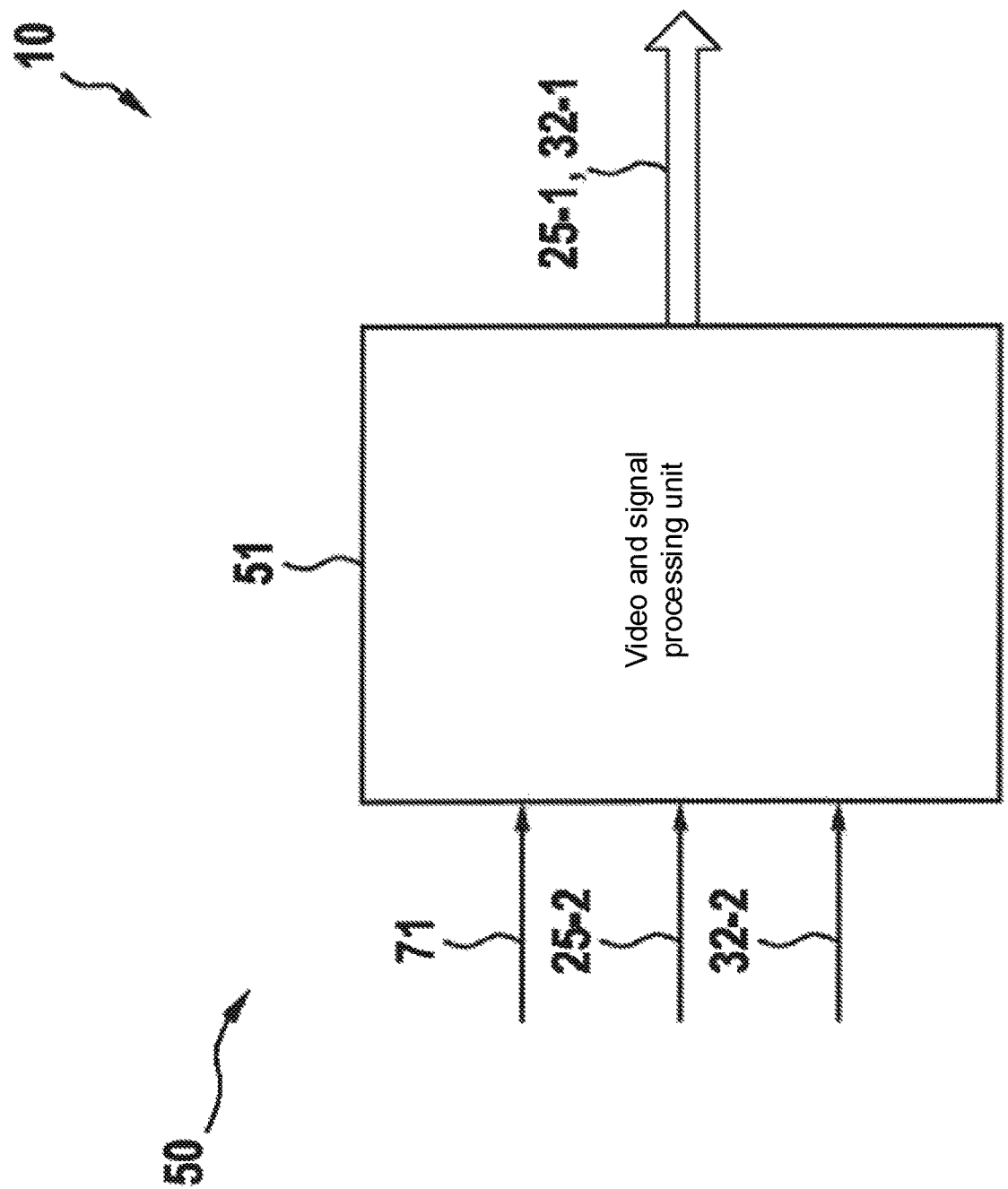

OPERATING METHOD AND CONTROL UNIT FOR A LASER PROJECTION UNIT, AND LASER PROJECTION UNIT

CROSS-REFERENCE TO RELATED APPLICATIONS

The present application is the national stage of International Pat. App. No. PCT/EP2018/057386 filed Mar. 22, 2018, and claims priority under 35 U.S.C. § 119 to DE 10 2017 209 271.8, filed in the Federal Republic of Germany on Jun. 1, 2017, the content of each of which are incorporated herein by reference in their entireties.

FIELD OF THE INVENTION

The present invention relates to an operating method and to a control unit for a laser projection unit and to a laser projection unit and, in particular, a laser projection unit of the flying spot type.

BACKGROUND

Laser projectors are utilized in many technical applications. In such laser projectors, data sets, in particular in the form of video files or the like, are utilized as the basis and are interpreted in order to project corresponding images or partial images, images, partial images, or frames represented by the data sets using an illumination unit including multiple laser light sources. Due to the utilization of laser light sources, certain safety aspects are to be taken into account, which relate, in particular, to eye safety. In this case, the brightness of the individual laser light sources is adjusted in such a way that certain brightness thresholds are not exceeded, so that an observer does incur damage to the retina.

In this case, an image illuminated entirely in white is always considered, hypothetically, to be the upper barrier. White frames are rarely utilized in the applications, so that an image sequence appears to be set too low in terms of its overall brightness.

SUMMARY

By comparison, an operating method according to the present invention for a laser projection unit has an advantage over the related art that the brightness of the images to be projected can be increased without the eye safety of the observer being endangered. This is achieved, according to the present invention, due to that an operating method for a laser projection unit and, in particular, for a laser projection unit of the flying spot type is created, including the steps of:

(A) providing a data set, in particular in the form of a video file, representing a sequence of images or partial images which are to be projected and are formed from image elements, in particular pixels, (B) before images or partial images are projected, examining the data set with respect to a brightness of image elements, determining a maximum brightness from the image elements and a relative brightness of the image elements in relation to the determined maximum brightness, and (C) projecting images or partial images of the data stream by activating an illumination unit.

In this case, laser light sources of the laser projection unit or an illumination unit of the laser projection unit are activated according to the relative brightnesses in such a way that the brightnesses of the laser light sources for an image element, which is to be projected, having a maximum relative brightness correspond, in sum, to a predetermined maximum absolute brightness, or lie in a safety interval below the predetermined maximum absolute brightness. This means, during operation, in particular for image elements or pixels having a maximum relative brightness as compared to other image elements or pixels, that the particular laser light sources are operated at a power, which, overall, i.e., summed for all laser light sources for these pixels or image elements, corresponds to the maximum permissible brightness, light intensity, or light power, at which, for example, damage to the observer does not yet occur and, in fact, in particular, during irradiation into the human eye.

Previously, reference was made only to the maximally illuminated image elements. A further increase in the image brightness can be achieved when all pixels are set in relation to the maximum brightness.

In this case, it is provided according to the present invention, in particular, that all image elements or pixels are generated with a brightness, intensity, or light power of the particular underlying laser light sources, which, in the sum of all laser light sources, does not exceed the predetermined maximum absolute brightness for the particular image element or pixel and, in particular, lies in a safety interval below the predetermined maximum absolute brightness, intensity, or light power.

In an example embodiment of the operating method according to the present invention this takes place in that laser light sources of the projection unit or of an illumination unit of the projection unit are activated according to the relative brightnesses in such a way that the particular brightnesses of the laser light sources for an image element or pixel to be projected, in their sum of all laser light sources for the particular image element or pixel, are present in a ratio with respect to the predetermined maximum absolute brightness, which corresponds to the particular determined relative brightness. Due to these measures, a quasi-proportional image is created between the relative brightnesses of the image elements or pixels of the images or partial images in the data set with respect to one another and the corresponding image elements or pixels of the images or partial images, which are projected.

Instead of such a proportional approach, another type of assignment can also take place, for example, in a monotonous or strictly monotonous way, which is not based on proportionality. In this way, image adaptations are implementable, if necessary in a spectrally dependent way.

Aspects of the biological or physiological effectiveness can also be taken into account, in particular in conjunction with various colors, for example, adjacent colors within the scope of colors of adjacent image elements or pixels of a given image element or pixel.

Video files are conceivable as data sets, as already mentioned above. Alternatively or additionally, real-time data streams of video sources, such as cameras or the like, are also options.

The examination of the data set can take place in different ways.

In an example embodiment of the operating method according to the present invention, step (B) of examining with respect to one or more sections of the data set or the entire data set is carried out in advance. Such a section can be made up of one scene, i.e., can be context-dependent, or can be temporally, if necessary variably, predefined. A preliminary analysis has the advantage that an examination result for the image material in its entirety is available before a projection begins. In this way, adaptations of the overall brightness of the images can be carried out in a particularly suitable manner. In an examination, in sections, of the data set, the brightness of the image sequence during the data flow can be gradually adapted, for example, constantly and, in particular, in a way that is barely noticeable by an observer, i.e., in particular, without abrupt changes in brightness, so that image scenes appear brighter overall. Local brightness maxima can be referenced, for example, brightness maxima in particular sections of the underlying data set.

Alternatively or additionally, it is conceivable in another embodiment of the operating method according to the present invention that step (B) of examining with respect to one or multiple sections of the data set or the entire data set is carried out in real time, in particular in the manner of a sliding window over the data set. In this procedure, the sections of the data set are not defined in advance, but rather arise in the data flow, in particular immediately before a projection. Using this approach as well, a continuous adaptation of the brightness of the images or partial images is possible without abrupt changes in brightness.

In an example embodiment of the operating method according to the present invention, the different projection mechanisms can be taken into account with respect to the particular projected spectra. In this case, it is provided, in particular, that step (B) of examining with respect to different spectral components of the particular image elements is carried out separately or in a combined manner, in particular with respect to the RGB colors, a separate predetermined maximum brightness being used as the basis, in particular, for each spectral component. Aspects of the physiological, if necessary damaging, effectiveness of the particular spectral components of the laser light in the human eye can also be taken into account.

Various measures can be implemented in order to specifically affect the operating properties of the light source unit and of the laser light sources on the basis of the examination result.

In an example embodiment of the operating method according to the present invention, it is provided that, during step (B) of examining, control data for activating the laser light sources of the illumination unit are generated and made available, in particular in a bijective assignment to images and image elements, in a manner integrated in the data set and/or in the manner of a sound or subtitle track. Due to these measures, a particularly compact representation of the adaptation of the intensities or brightnesses of the laser light sources of the light source unit to the particular underlying data set results.

The projection result and the hazard potential depend not only on the relative intensities of the individual image element of the images or partial images in the data set. Rather, the actual physical parameters of the light source unit and of the projecting elements are also taken into account.

In order to be able to take such aspects into account, according to an example embodiment of the method according to the present invention, during step (B) of examining, parameters of the illumination unit and, in particular, of the laser light source, in particular, wavelength ranges, laser classes, maximum laser power, spectral power distribution, and/or pulse duration, and/or parameters of the projection unit, in particular a scanning speed, are/is used as the basis.

In order to implement health-related aspects and legal requirements, it is advantageous, in particular, when, according to an example embodiment of the operating method according to the present invention, during step (B) of examining, a single pulse criterion, according to which the power of a single pulse is not permitted to exceed a predetermined limiting value of an accessible radiation, a mean value criterion, according to which the mean power of a pulse sequence in a given period of time is not permitted to exceed a predetermined limiting value of an accessible radiation in this period of time, and/or an additivity criterion, according to which a pulse-specific energy is not permitted to fall below a predetermined limiting value of an accessible radiation for a single pulse multiplied by a correction factor, are utilized as the basis.

Particularly time-saving embodiments of the operating method according to the present invention can be formed in that, during step (B) of examining, operating time periods of a pause mode, a fast forward mode and/or a fast rewind mode are set and utilized as the basis. As a result, periods of time are utilized, in which the underlying hardware is either not utilized or is utilized in a way in which the underlying image material is scanned anyway.

Moreover, the present invention relates to a control unit for a laser projection unit and, in particular, for a laser projection unit of the flying spot type, which is configured for carrying out an operating method according to the present invention.

Moreover, according to the present invention, a laser projection unit and, in particular, a laser projection unit of the flying spot type is provided which is designed encompassing an illumination unit including a plurality of laser light sources, a projection unit, and a control unit for controlling the illumination unit and/or the projection unit, the control unit being designed according to the present invention.

Example embodiments of the present invention are described in detail with reference to the attached figures.

BRIEF DESCRIPTION OF THE DRAWINGS

FIG. 2 shows, in the manner of a block diagram, an embodiment of a control unit according to the present invention for carrying out the operating method according to the present invention.

DETAILED DESCRIPTION

Figure 1:
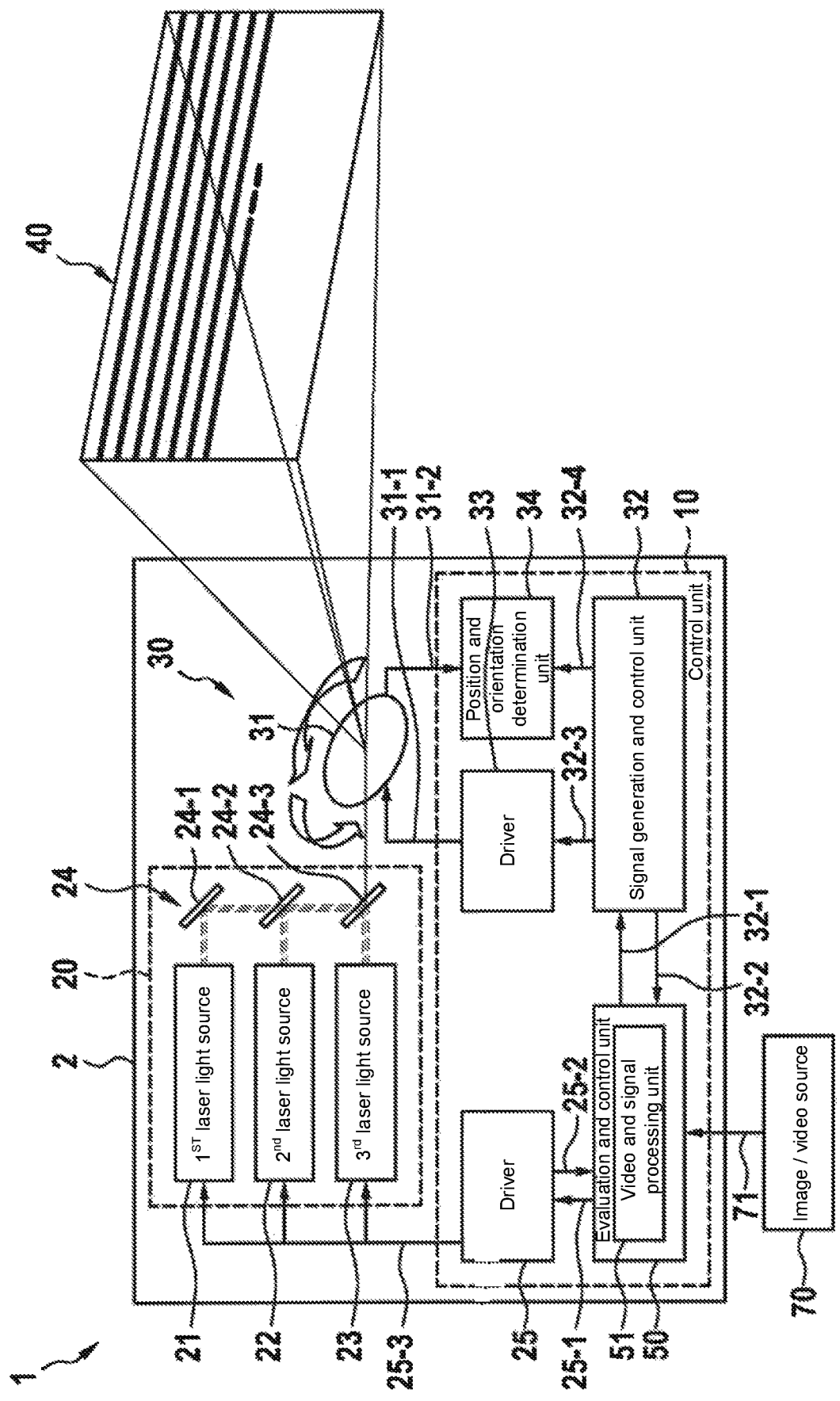
FIG. 1 shows a schematic view of a laser projection unit invention in a laser projection system according to an example embodiment of the present invention.

Example embodiments of the present invention are described in detail in the following with reference to FIGS. 1 and 2. Identical and equivalent, as well as identically or equivalently acting, elements and components are labeled using the same reference numerals. The detailed description of the labeled elements and components is not presented in every case of their occurrence.

The represented features and further properties can be isolated with respect to one another in an arbitrary way and can be arbitrarily combined with one another without departing from the scope of the present invention.

FIG. 1 shows a schematic view of an example embodiment of laser projection unit 2, according to the present invention, in a laser projection system 1.

Laser projection unit 2, according to the present invention, of laser projection system 1 according to FIG. 1 is made up, according to the scope of the present invention, of light source unit 20 for generating primary light, encompassing a first laser light source 21, a second laser light source 22, and a third laser light source 23, for example, in the form of laser diodes in each case, a projection unit 30, and a control unit 10 for controlling light source unit 20 and projection unit 30.

Projection unit 30 is utilized for directing the primary light of light source unit 20, which is supplied via a deflecting optics 24 encompassing first through third deflecting mirrors in 24-1, 24-2, 24-3, onto a display unit 40. For this purpose, in the example embodiment according to FIG. 1, projection unit 30 encompasses a two-dimensionally swivelable scanning mirror 31, which is movable in such a way that it scans the display surface of display unit 40 row by row. Other scanning modes are also conceivable.

The control of projection unit 30 and, in particular, of the movement of scanning mirror 31 takes place in combination with the control of light source unit 20 and its first through third laser light sources 21, 22, 23.

In order to control projection unit 30, a signal generation and control unit 32 is provided, which is connected, on the one hand, via a control and detection line 32-3 to a driver 33 for projection unit 30 and, in particular, for scanning mirror 31 and, on the other hand, is connected via a further control and detection line 32-4 to a position and orientation determination unit. Driver 33 is utilized for the actual activation of scanning mirror 31, whereas a feedback regarding the position and/or orientation of mirror 31 relative to the three spatial directions and, in particular, relative to a display surface of display unit 40, can be ascertained using position and orientation determination unit 34.

The activation of and feedback by signal generating and control unit 32 takes place via control and detection lines 32-1 and 32-2 to underlying evaluation and control unit 50.

The activation of light source unit 20 also takes place via evaluation and control unit 50 as part of control unit 10 according to the present invention, under insertion of a driver 25, for example, a laser driver, namely via control and detection lines 25-1 and 25-2.

During operation of laser projection unit 2 according to the present invention, the supply of a data stream from an image or video source 70 takes place via an input port 71. Image or video source 70 can be a camera unit, a playback device, or a memory. The data stream supplied to control unit 10 via input port 71 is evaluated using evaluation and control unit 50, in particular using a video and signal processing unit 51, on the basis of an example embodiment of the operating method according to the present invention.

As the result of the evaluation carried out by video and signal processing unit 51, by evaluation and control unit 50, and by control unit 10 according to the present invention, a combined activation of light source unit 20 and projection unit 30 then takes place including an appropriately content-dependently adapted brightness distribution on display unit 40 under consideration of the eye safety of the observer.

FIG. 2 shows, in the manner of a block diagram, an embodiment of a control unit 10 according to the present invention for carrying out the operating method according to the present invention, an evaluation and control unit 50, as part thereof, being provided with an appropriate video and signal processing unit 51.

The supply of the data stream takes place via input port 71. The data stream represents a sequence of images or partial images and can be designed, in particular, in the manner of a video file.

Via control and detection line 25-2, operating parameters associated with light source unit 20 and light sources 21, 22, 23 can be transmitted to video and signal processing unit to use these operating parameters as the basis for the operating method and, in particular, as the basis for the examination of the data set with respect to a brightness of image elements. These data can relate to a particular laser class and/or spectrally dependent performance parameters.

Via a control and detection line 32-2, parameters associated with the design and the operation of projection unit 30 can be transmitted to video and signal processing unit 51 in order to be utilized as the basis for the processing. Such parameters can relate, for example, to scanning parameters and other projector parameters.

On the basis of the processing and evaluation carried out in video and signal processing unit 51 of control unit 10 according to the present invention, an appropriate and content-dependent activation of light source unit 20 and/or projection unit 30 takes place and, in fact, via control and detection lines 25-1 and 32-1.

These and further features and properties of the present invention are explained in greater detail with reference to the following descriptions.

The present invention also relates, in particular, to laser-based projectors, construed as laser projection units 2, preferably micro- or pico-projectors of the flying spot type, having increased brightness by utilizing an adaptive, image content-dependent adaptation of the laser power, preferably under consideration of the eye safety thresholds, as well as operating control methods and control units for such projectors 2.

For existing laser-based flying spot projectors, for example, having a design according to FIG. 1, the permissible laser power is determined assuming that a fully illuminated image exists as a white frame at any time. It is assumed, in this case, that each pixel is irradiated with the full power and, in fact, at any time.

The power of laser light sources 21, 22, 23 and, in particular, of the laser diodes, is limited, in this case, by the limiting values predefined in the laser safety standard IEC 60825-1, in Germany DIN EN 60825-1 dated July 2015, whereby the image brightness of these projectors is also limited. According to the standard, all distances of the eye to the apparent source from 10 cm to infinity are to be examined, taking into account all accommodation states of the eye and applying the following three pulse criteria to the ascertained pulse pattern:

Single pulse criterion: a single pulse is not permitted to exceed the limiting value of accessible radiation, also referred to as limiting value of accessible radiation;

Mean value criterion: the mean power of a pulse sequence of time T is not permitted to exceed the limiting value of accessible radiation (T); and Additivity criterion: the energy per pulse is not permitted to exceed the limiting value of accessible radiation for a single pulse, multiplied by the correction factor C5.

An approach of the present invention is that a present image or video file is scanned one time or is extensively scanned in advance, in order to ascertain the actual image illuminations. This means, the laser safety standards can be applied to the particular pixel irradiation to be actually implemented. Therefore, higher powers can be made possible, because a white frame is not actually constantly displayed in practical application.

An aspect of the present invention is an adaptive and image content-dependent power regulation of laser light sources 21, 22, 23 of a laser projector 2 and, in particular, of a flying spot projector 2 for an optimal or maximum image brightness under consideration of the presently applicable laser safety standards.

As a result, it is made possible to restrict the limitation of the permissible power not on the basis of a potential worst case, for example, a white frame, given a pupil position at the edge, but rather to utilize the real present image contents as the basis for the calculation of the brightness of light sources 21, 22, 23.

If, for example, image contents are represented only in the image center, i.e., the image edge is black, a brighter image is possible.

The following advantages arise:

laser projectors 2 including brighter images in compliance with safety standards are possible;

the calculation of the maximum brightness can take the image content as well as the laser projector parameters into account;

due to adaptive power redistribution without limiting individual laser sources 21, 22, 23, each laser source 21, 22, 23 itself can output the permissible power if a pixel is represented only by this color;

a partial image optimization is possible using an appropriate algorithm;

new standard developments can be taken into account in a simple and reliable way, for example, using software, without this requiring a change to the hardware; and laser projector 2 according to the present invention can be operated in various operating modes, for example, with laser class 2 for a bright image or with laser class 1 for a "child-safe" product.

FIG. 2 schematically shows aspects of the present invention within the scope of a system design or also within the scope of a basis for an algorithm, which considers the possible pulse trains or radiation scenarios for every possible pupil position in the image.

This takes place, for example, similarly to the principle of the moving average. Therefore, an observation window having a fixed width is defined (or multiple secondary time windows are defined according to the laser safety rules for pulsed sources 21, 22, 23, which requires the consideration and averaging of pulses across several different time windows), which determines a maximum permissible exposure/energy for each pixel and, therefore, for each point in time. This observation window is then "shifted" one time using the present video file. The time window must contain all secondary time windows between a single pulse up to the maximum observation time period of 100 s (for laser class 1). All three pulse criteria (cf. IEC 60825-1, scanning lasers as pulsed lasers) are evaluated for each time window. This can take place, depending on the computing power, in real time or can be carried out one time for a video in order to deliver the results for the user in an additional operating file or as a data segment in the video file, for example, as a type of subtitle track.

In addition, the approach offers the possibility of optionally determining the permissible power for class 1 or 2, in order to ensure greater protection, for example, during utilization by children.

A setting for class 3 (R or B) is also possible, if projector 2 has undergone appropriate structural safety measures. This could be, for example, a safety box for mobile phones, which ensures a minimum distance and, therefore, limits the most hazardous distance, cf. IEC 60825-1, which can be assumed by the eye. In addition, the coupling to a distance sensor for the same purpose is also conceivable.

The evaluation requires input values in the form of the pulse lengths and the chronological occurrence of the pulses in this case. Output values are the limiting values of permissible power for each criterion and for each pixel in the chronological sequence. A selection can then be made as to whether the image is to be equally bright whenever possible or whether the maximum power is utilized at any time. A selection can also be made as to whether the pixels in the center of the image, which have a lower hazard potential, are to be represented more brightly or adjusted down, in order to achieve a more homogeneous image brightness.

Moreover, the color values of the image material can be corrected in such a way that the color mixture contains a preferably high portion of wavelengths, which favorably lie on the V(ë) curve, i.e., generate a high brightness from low power.

Once the permissible power has been determined for each color using this intelligent image evaluation, the case can also occur, in which a pixel, as an image element, is illuminated exclusively from one of the laser sources 21, 22, 23. Therefore, underlying laser projection system 2 must be able to provide the maximum permissible exposure from each source 21, 22, 23 individually. Overall, three times the maximum permissible exposure would therefore be available during simultaneous operation of all three sources 21, 22, 23 (RGB) provided a maximum permissible exposure is output in each case. In this case, according to the present invention, overall, only the predetermined maximum permissible overall exposure, overall intensity, or overall brightness is always emitted jointly or as the sum of all laser light sources 21, 22, 23 for a given image element or pixel. This means, a laser light source 21, 22, 23 is only operated in such a way that it emits the predefined maximum permissible overall intensity itself only when the corresponding image element or pixel to be generated only has the color corresponding to operated laser light source 21, 22, 23; all other laser light sources are therefore not operated.

Values for the brightness are presented, by way of example, in following Table 1 for a projector 2 including laser diodes as light sources 21, 22, 23 having wavelengths 450 nm, 520 nm, and 640 nm.

TABLE 1

Improvement of image brightness

|  | V(ë) | Previous brightness | Brightness according to the present invention |
| --- | --- | --- | --- |
| Brightness of white frame | 15.8% B; 28.6% G; 55.6% R | 20.0 lm | 20.0 lm |
| Brightness of red frame | 0.175 | 6.4 lm | 11.4 lm |
| Brightness of green frame | 0.710 | 13.3 lm | 46.4 lm |
| Brightness of blue frame | 0.038 | 0.39 lm | 2.5 lm |

The V(ë) curve of the eye is to be taken into consideration in all compensations or approaches for compensating for different image brightnesses. This offers great potential, in particular, for images having a high amount of green.

When laser class 1 is utilized, the thermal damage for R, G, and B as well as the photochemical damage only for G and B are to be taken into account. When, in this case, for example, only a red image content is represented, the photochemical hazard no longer needs to be taken into account, whereby brighter images also result.

Finally, a partial image optimization can also be carried out on the basis of the video data as well as pulse durations and wavelengths. "Partial images" are understood to mean that an image of a frame is not written all at once, i.e., during a given scan pass, but rather is subdivided into multiple partial images. For example, in the case of two partial images, the target image could be generated according to the system of a chessboard. The two partial images together generate an overall image.

The number of possible partial images results from the projector parameters, for example, the scanning speed. On the basis of a given number of possible partial images, an optimization algorithm can determine an ideal partial image pattern, in order to increase the permissible power.

In this way, using a skillful selection of partial images, it can be achieved, for example, that the time between the single pulses within a row is increased, while the distance between the rows is decreased.

The measures must be selected according to the most critical rules of the pulse criterion. In order to ensure safe operation of the product at any time, a reduced brightness can be set during fast forwarding and fast rewind, and the power is adapted to a presently represented still image during a pause or another playback interruption.

The brightness regulation need not necessarily follow the calculated maximum permissible exposures absolutely precisely, but rather can be interpolated, in order to avoid flickering.

What is claimed is:

1. A method for operating a laser projection unit for image projection over time, the method comprising:
   providing a data set representing a sequence of images or partial images that are to be projected and are formed from image elements;
   performing an examination of the image elements to be projected over time in which, for each of a plurality of sequential respective points in time, all of the image elements within a single time unit are considered, wherein:
      the time unit is a sliding time window that includes the respective point in time and (a) one or more of the points in time immediately preceding the respective point in time and/or (b) one or more of the points in time immediately following the respective point in time; and
      the examination includes:
         examining a respective brightness of each of the image elements of the data set within the time unit of the respective point in time;
         determining a maximum brightness of all of the image elements of the data set based on the examined respective brightness of the each of the image elements of the data set; and
         determining for each of the image elements a respective brightness relative to the determined maximum brightness; and
   for the each respective one of the plurality of sequential points in time, projecting the images or partial images by activating laser light sources of an illumination unit such that, using the respective brightnesses for each of the image elements to be projected for the respective point in time which have been determined in the time unit corresponding to the respective point in time, a sum of brightness of all of a respective one or more of the laser light sources that is used for projecting the image elements of the respective point in time does not exceed a predetermined maximum absolute brightness.

2. The method of claim 1, wherein the laser light sources are activated according to the relative brightnesses such that a ratio of (a) a sum of respective brightnesses of all of the laser light sources for an image element to be projected (b) to the predetermined maximum absolute brightness corresponds to the respective determined relative brightness of the respective image element.

3. The method of claim 1, wherein the examining, with respect to one or more sections of the data set, is performed before any of the images or partial images is projected.

4. The method of claim 1, wherein the examining, with respect to one or more sections of the data set, is carried out in real time.

5. The method of claim 1, wherein the examining, with respect to different spectral components of the image elements, is carried out separately or in a combined manner with respect to the RGB colors, a respective predetermined maximum brightness being used as a respective basis for each spectral component.

6. The method of claim 1, wherein, during the examining, control data for activating the laser light sources are generated and made available in a bijective assignment to images and image elements, in a manner integrated in the data set and/or in a manner of a sound or subtitle track.

7. The method of claim 1, wherein the examining is performed based on one or more parameters of the laser projection unit and of the laser light source.

8. The method of claim 7, wherein the one or more parameters include wavelength ranges, laser classes, maximum laser power, spectral power distribution, and/or pulse duration.

9. The method of claim 1, wherein the examining is performed based on one or more parameters of a projector.

10. The method of claim 9, wherein the one or more parameters include a scanning speed.

11. The method of claim 1, wherein the examining is performed based on:
   a single pulse criterion according to which a power of a single pulse is not permitted to exceed a predetermined limiting value of an accessible radiation;
   a mean value criterion according to which a mean power of a pulse sequence in a given period of time is not permitted to exceed a predetermined limiting value of an accessible radiation in the respective period of time; and/or
   an additivity criterion according to which a pulse-specific energy is not permitted to fall below a predetermined limiting value of an accessible radiation for a single pulse multiplied by a correction factor.

12. The method of claim 1, wherein the examining is performed based on operating time periods of a pause mode, a fast forward mode, and/or a fast rewind mode.

13. The method of claim 1, wherein the laser projection unit is a flying spot laser projection unit.

14. The method of claim 1, wherein the data set is provided as a video file.

15. The method of claim 1, wherein the image elements are pixels.

16. The method of claim 1, further comprising:
   for each respective one of the points in time, in response to determining that the image elements of the respective point in time that are to be illuminated are all in a center region and not in an edge region, raising the sum of the brightness.

17. A control unit for a laser projection unit, the control unit comprising a processor, wherein the processor is configured to, for a data set representing a sequence of images or partial images that are to be projected and are formed from image elements:
   perform an examination of the image elements to be projected over time in which, for each of a plurality of sequential respective points in time, all of the image elements within a single time unit are considered, wherein:
   the time unit is a sliding time window that includes the respective point in time and (a) one or more of the points in time immediately preceding the respective point in time and/or (b) one or more of the points in time immediately following the respective point in time; and
   the examination includes:
      examining a respective brightness of each of the image elements of the data set within the time unit of the respective point in time;
      determining a maximum brightness of all of the image elements of the data set based on the examined respective brightness of the each of the image elements of the data set; and
      determining for each of the image elements a respective brightness relative to the determined maximum brightness; and
for the each respective one of the plurality of sequential points in time, cause projection of the images or partial images by activating laser light sources of an illumination unit such that, using the respective brightnesses for each of the image elements to be projected for the respective point in time which have been determined in the time unit corresponding to the respective point in time, a sum of brightness of all of a respective one or more of the laser light sources that is used for projecting the image elements of the respective point in time does not exceed a predetermined maximum absolute brightness.

18. A laser projection unit comprising:
an illumination unit including a plurality of laser light sources;
a projector; and
a control unit, wherein:
   the control unit includes a processor that is configured to control the illumination unit and the projector for projection of a sequence of images or partial images that are formed from image elements; and
   the processor is configured to, for a data set representing the sequence of images or partial images that are to be projected:
      perform an examination of the image elements to be projected over time in which, for each of a plurality of sequential respective points in time, all of the image elements within a single time unit are considered, wherein:
         the time unit is a sliding time window that includes the respective point in time and (a) one or more of the points in time immediately preceding the respective point in time and/or (b) one or more of the points in time immediately following the respective point in time; and
         the examination includes:
            examining a respective brightness of each of the image elements of the data set within the time unit of the respective point in time;
            determining a maximum brightness of all of the image elements of the data set based on the examined respective brightness of the each of the image elements of the data set; and
            determining for each of the image elements a respective brightness relative to the determined maximum brightness; and
      for the each respective one of the plurality of sequential points in time, cause projection of the images or partial images by activating the laser light sources of the illumination unit such that, using the respective brightnesses for each of the image elements to be projected for the respective point in time which have been determined in the time unit corresponding to the respective point in time, a sum of brightness of all of a respective one or more of the laser light sources that is used for projecting the image elements of the respective point in time does not exceed a predetermined maximum absolute brightness.

* * * * *